United States Patent
Smith et al.

[11] Patent Number: 5,824,417
[45] Date of Patent: Oct. 20, 1998

[54] LAMINATED SHEETING AND METHOD FOR ITS FABRICATION

[75] Inventors: Daniel S. Smith, Sioux Falls; Clark R. Lee, Brandon, both of S. Dak.

[73] Assignee: Raven Industries, Inc., Sioux Falls, S. Dak.

[21] Appl. No.: 675,599

[22] Filed: Jul. 3, 1996

[51] Int. Cl.$^6$ .................................................. B32B 27/08
[52] U.S. Cl. ............................................................ 428/424.4
[58] Field of Search ............................................ 428/424.4

[56] References Cited

U.S. PATENT DOCUMENTS

| | | |
|---|---|---|
| 3,695,967 | 10/1972 | Ross . |
| 3,787,546 | 1/1974 | Pratt et al. . |
| 3,953,566 | 4/1976 | Gore . |
| 4,082,877 | 4/1978 | Shadle . |
| 4,228,215 | 10/1980 | Hein, III . |
| 4,232,620 | 11/1980 | Kurz . |
| 4,623,574 | 11/1986 | Harpell et al. . |
| 4,687,692 | 8/1987 | Akao . |
| 5,296,291 | 3/1994 | Mueller . |

Primary Examiner—Johann Richter
Assistant Examiner—Taofiq A. Solola
Attorney, Agent, or Firm—Hill & Simpson

[57] ABSTRACT

A composite laminate material particularly adapted for outside conditions such as for environmental linings has an imperforate sheet and a perforate sheet adhesively secured together by a tie layer of molten thermoplastic. A reinforcing material can be encapsulated in the tie layer to form a reinforced composite film which allows trapped water vapor within the laminate to pass through the perforated sheet to prevent delamination.

21 Claims, 2 Drawing Sheets

LAMINATED SHEETING AND METHOD FOR ITS FABRICATION

BACKGROUND OF THE INVENTION

The present invention relates to laminating flexible sheeting and in particular to laminating thermoplastic materials for producing a long lasting weather resistant plastic sheet or liner.

Plastic sheeting and liners are important for many outdoor uses, particularly for lining water storage structures, or weatherproofing structures. This plastic sheeting can be used for example for lining ponds at waste treatment facilities or landfill facilities where a water impermeable layer is required. It is desirable to produce a reinforced thermoplastic film which is constructed by laminating two or more separate sheets together with a reinforcing material bonded between the sheets. However, after prolong exposure to the elements including moisture and heat or cold, prior known laminated thermoplastic sheets can delaminate, wherein the single reinforced film returns to its individual layers making it useless for most applications.

Typically, to construct a laminated film, two or more individual sheets of thermoplastic film are fed through a nip formed by a set of pressure rollers. In front of the pressure rollers, a reinforcing scrim, which is a mesh or a fabric or a layer of reinforcing fibers, and a layer of molten thermoplastic are introduced which bonds the sheets and encapsulates the reinforcing scrim, forming a single reinforced laminated film. Use of the reinforcing scrim is optional, depending on the application contemplated for the film. It is possible that moisture introduced into the laminated film between the two sheets of thermoplastic film either during manufacture or in use causes the delamination of the two sheets by expanding thereafter, subject to extremes in temperature from the outside environment.

SUMMARY OF THE INVENTION

It is an object of the present invention to provide a laminated film which is impermeable to water such as to form a useful film for water retention or as a water barrier but which resists moisture induced delamination. It is an object of the invention to provide a laminated film which is resistant to delamination even when exposed to moisture, cold and heat and outside ambient conditions. It is an object of the invention to provide a laminated film which includes two facing layers with a reinforcing layer therebetween.

It is an object of the invention to provide a laminated film manufacturing method which produces a laminate film resistant to delamination due to trapped moisture from the environment or from the manufacturing process.

The object of the invention is achieved by providing a laminated film having a tie layer therebetween to bond a top and bottom layer together. Optionally, the tie layer includes a reinforcing scrim such as a mesh, a fabric, a layer of reinforcing fibers or other such known reinforcing materials. According to the invention, one of the layers is provided with a plurality of through-holes or perforations over its surface, the perforations being spaced apart. The perforations can penetrate the one layer entirely to a depth approximately half way through the laminated film. According to the invention, the minuscule holes or perforations allow internal pressure, from water and water vapor, to escape from the laminate film without delamination occurring and, without a significant change in the physical properties of the reinforced film. Additionally, the perforations allow a exceptional gripping of the one layer to the tie layer to increase delamination resistance.

The process of manufacturing the composite film of the present invention involves passing the one layer through a nip formed by a steel roller covered with sharpened pins and a rubber roller pressed thereto, to perforate the film before reaching a lamination station. The thus perforated film is combined with a scrim reinforcing sheet and passed into a pressure nip which also receives a curtain of molten thermoplastic and the other sheet. The pressure nip is cooled to help solidify the laminate structure composed of the imperforate sheet, molten thermoplastic, reinforcing scrim, and the perforated sheet together in a composite reinforced lamination.

Although a two-ply laminate film is described as an exemplary embodiment, multiple layers can be laminated with some layers being perforated to allow passage of moisture through those layers, either to an outside of the laminate or to a place in the laminate where delamination is not a concern or where moisture will pass out of the laminate.

The present invention thus provides an advantageous method of manufacturing a reinforced laminate film as well as providing an advantageous reinforced film which resists delamination even when subjected to moisture and varying ambient temperatures.

DETAILED DESCRIPTION OF THE PREFERRED EMBODIMENTS

Figure 1:
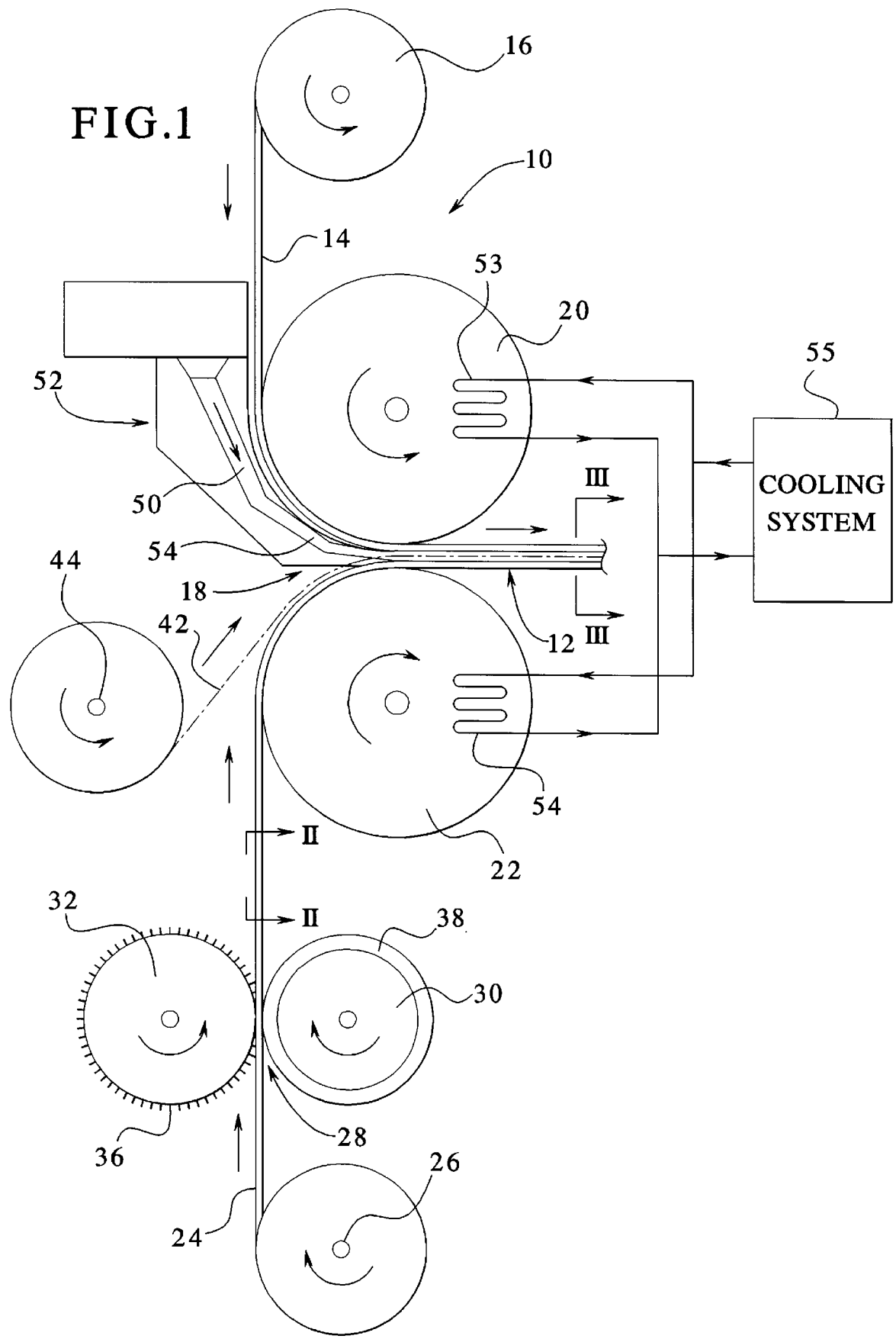
FIG. 1 is a schematic view of a process for manufacturing a laminate film of the present invention.

FIG. 1 illustrates an apparatus 10 for producing the inventive laminate film 12 of the present invention. A first sheet 14 is delivered from a reel 16 to a nip 18 formed between a first pressure roller 20 and a second pressure roller 22. The first sheet advantageously is composed of ethylene units which may comprise polyethylene homopolymer and/or copolymers, and can be 1 to 10 mils thick. A second sheet 24 is unreeled from a second supply reel 26 and passes into a perforation nip 28 formed by a backup roller 30 and a perforation roller 32. The perforation roller 32 is a steel roller covered with sharpened pins 36 on an outside thereof. The back up roller 30 includes a neoprene rim 38 for pressing the second sheet 24 against the perforation roller 32 to penetrate the second sheet 24 completely therethrough with the pins 36. The sharpened pins 36 are typically 0.040 inches in diameter and ⅛ inch long. The second sheet 24 is also advantageously composed of ethylene units which may comprise polyethylene homopolymer and/or copolymers from 1 to 10 mils thick.

The thus perforated second sheet 24 is drawn into the nip 18 by the rollers 20, 22. A scrim reinforcing sheet 42, being a fabric, or a mesh, or a supply of reinforcing fibers is unreeled from a reinforcing reel 44 and drawn into the nip 18 on top of the perforated sheet 24. The sheet 42 is advantageously composed of multifilament fibers having a thickness of 500 to 2000 denier, and particularly 840 to 1200 denier.

Between the reinforcing sheet 42 and the first sheet 14, a supply of molten thermoplastic 50 is introduced from an extruder 52 having a slot like nozzle 54 sized for the correct thickness of molten thermoplastic as well as being elongate to span a width of the sheet 14. The extruder 52 provides the molten thermoplastic 50 as a molten curtain composed of ethylene units which may comprise polyethylene homopolyer and/or copolymers advantageously between 0.5 to 3 mils thick. The molten thermoplastic 50 is cooled by the pressure rollers 20, 22 which can be provided with cooling means, such as liquid coolant in cooling channels 53, 54 (shown schematically) within the rollers. The coolant is cooled by a cooling system 55 (shown schematically). The thus cooled molten thermoplastic 50 acts as an adhesive layer to bond the first and second sheets 14, 24 together.

Downstream of the pressure rollers 20, 22 further cooling can be provided and the finished product is reeled or otherwise packaged or used. Other methods of bonding the first sheet 14 and the second sheet 24 such as by spraying, rolling, dipping, or painting on, either molten thermoplastic or other adhesive or other tie materials, are encompassed by the present invention.

Figure 2:
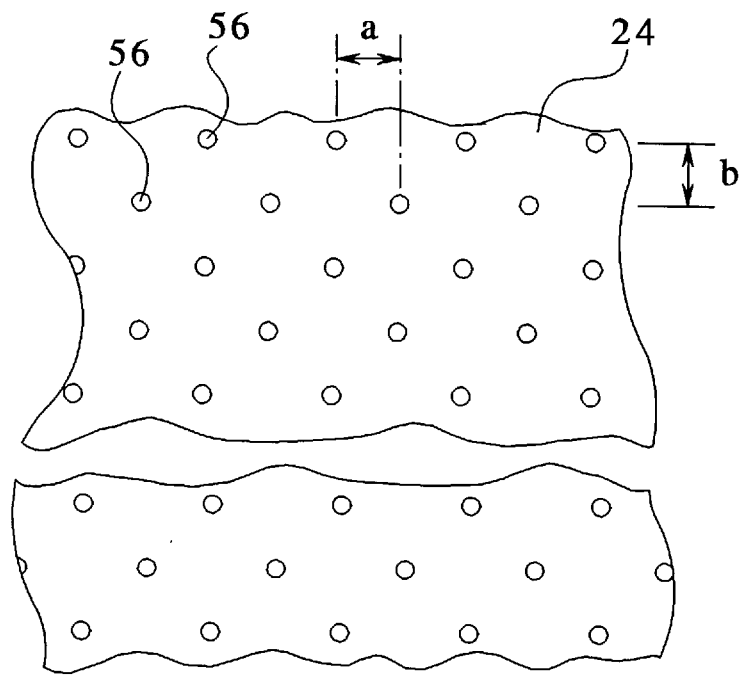
FIG. 2 is a sectional view taken generally along line II—II of FIG. 1.

FIG. 2 shows the perforation pattern of the second layer 24 having perforations 56 spaced laterally at the dimension a and longitudinally at the dimension b. Advantageously both a and b are 3/16 inch, forming a staggered pattern.

Figure 3:
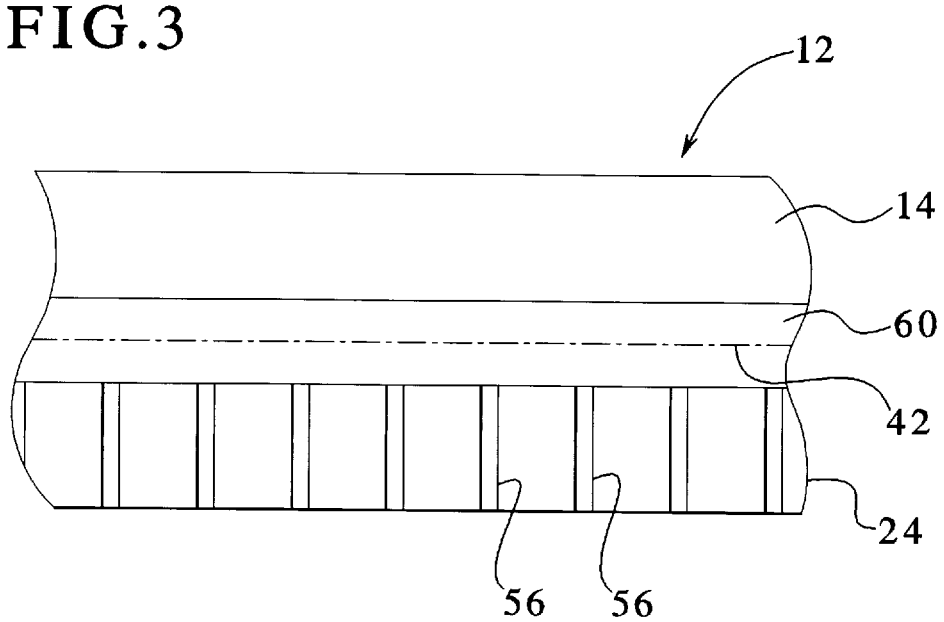
FIG. 3 is a enlarged sectional view taken generally along line III—III of FIG. 1.

FIG. 3 illustrates the completed laminate 12 having top layer 14 bonded by the now cooled molten thermoplastic layer 60 formed by the molten thermoplastic 50, the optional reinforcing layer 42 encapsulated therein, and the bottom layer 24 having the perforations 56 extending completely therethrough to the tie layer 60. The layers 14, 60, 24 form a composite integrated laminate material 12 which is resistive to delamination. Any moisture, water or water vapor which is trapped within the lamination can pass through the perforations 56 without being trapped within the lamination between the layers 14, 24 or between the respective layers 14, 24 and the tie layer 60. This prevents delamination of the otherwise integrated layer structure caused by trapped water or water vapor expanding or vaporizing and being trapped within the lamination. Thus, extremes in temperature which allow moisture to change phases or expand and contract are readily accommodated by the perforated second sheet 24.

Although FIG. 3 shows a two ply laminate with the imperforate layer 14 and perforate layer 24 bonded together, it is encompassed by the invention to laminate plural layers greater than two together, including at least one perforated sheet 24. Plural perforated layers can be laminated together to allow a moisture pathway through the perforated sheets out of the laminated film. Perforated sheets can be applied on opposing sides of an imperforate sheet to allow moisture to pass in two directions. Also, one or more laminated sheets can be arranged to provide moisture passage not only to the outside of the laminated film but alternately to a particular layer where delamination is not a concern or which layer will absorb or pass the moisture.

Although the present invention has been described with reference to a specific embodiment, those of skill in the art will recognize that changes may be made thereto without departing from the scope and spirit of the invention as set forth in the appended claims.

We claim as our invention:

1. A laminated film comprising:

a sheet;

an imperforate second sheet in facing relation with said first sheet with a tie layer sandwiched therebetween, said tie layer adhesively securing the first sheet to the second sheet, said tie layer comprising a reinforcing sheet encapsulated therein, said reinforcing sheet comprising multi filament polyester, said first sheet having a plurality of perforations therethrough, spaced apart over a surface of said first sheet.

2. The laminated film according to claim 1, wherein said first sheet, said second sheet and said tie layer are thermoplastic films composed of ethylene units.

3. The laminated film according to claim 1, wherein said tie layer is composed of polyethylene.

4. The laminated film according to claim 3, wherein the polyethylene is 0.5 to 3 mils thick.

5. The laminated film according to claim 1, wherein said reinforcing sheet comprises multifilament polyester having a thickness of 500 to 2000 denier.

6. The laminated film according to claim 5, wherein said reinforcing sheet comprises multifilament polyester having a thickness 840 to 1200 denier.

7. The laminated film according to claim 1, wherein said first sheet is perforated with 0.040 inch diameter holes spaced apart at 3/16 inch intervals in a staggered pattern.

8. The laminated film according to claim 1, wherein one of said first and second sheets is composed of polyethylene.

9. The laminated film according to claim 1, wherein said first and second sheets are composed of ethylene units.

10. An apparatus for manufacturing a laminated film, comprising:

a pressure means for receiving separate films and laminating said films together;

a first supply means for supplying a first sheet to said pressure means;

a second supply means for supplying a second sheet;

a perforation means upstream of said pressure means for receiving said second sheet from said second supply means, perforating said second sheet over its surface with spaced apart perforations, and delivering said second sheet to said pressure means, said perforation means having a perforating surface for engaging in perforating said second sheet.

11. The apparatus according to claim 10, wherein said perforation means comprises a roller having a plurality of perforating pins extending radially outward from a surface of the roller, and a back up roller having a resilient surface and pressed to said perforating roller forming a nip therebetween for receiving said second sheet.

12. The apparatus according to claim 10, further comprising a tie layer supply means for applying an adhesive layer between said first sheet and said second sheet upstream of said pressure means.

13. The apparatus according to claim 12, wherein said tie layer supply means comprises an elongate nozzle for supplying molten thermoplastic into said pressure means between said first and second sheets.

14. The apparatus according to claim 10, further comprising a reinforcing sheet supply means for supplying a reinforcing sheet to said pressure means between said first and second sheets.

15. The apparatus according to claim 14, wherein said reinforcing sheet supply means comprises a reel of a reinforcing fabric.

16. The apparatus according to claim 10, wherein said pressure means comprises two oppositely rotating pressure rollers forming a pressure nip therebetween.

17. The apparatus according to claim 16, further comprising a tie layer supply means for applying an adhesive layer between said first sheet and said second sheet upstream of said pressure rollers, and wherein said pressure rollers are cooled to solidify said adhesive layer.

18. A method of manufacturing a laminated film comprising the steps of:

supplying a first sheet to a laminating station;

supplying a tie layer to the laminating station;

providing a second sheet to a perforating station upstream of the laminating station, perforating the second sheet over its surface with spaced apart perforations;

transferring the perforated sheet from the perforating station to the laminating station and laminating said first sheet, said tie layer and said second perforated sheet together to form a laminated film.

19. The method according to claim 18, comprising the further step of supplying a reinforcing material to the laminating station between the first and second sheets to be laminated between the first and second sheets.

20. The method according to claim 18, wherein said step of providing a tie layer is further defined in that the tie layer comprises a molten thermoplastic provided as a curtain between the first and second sheets.

21. The method according to claim 18, wherein said laminating station comprises the steps of rolling said first sheet, said tie layer, and said second sheet together between oppositely rotating nip rollers; and cooling said laminated film by said nip rollers.

* * * * *